United States Patent [19]

Harmsen

[11] 4,363,291
[45] Dec. 14, 1982

[54] AUTOMATIC CATTLE FEEDING DEVICE

[75] Inventor: Jan H. Harmsen, Hengelo, Netherlands

[73] Assignee: Brinkmann & Niemeyer N.V., Zutphen, Netherlands

[21] Appl. No.: 208,080

[22] Filed: Nov. 18, 1980

[30] Foreign Application Priority Data

Nov. 19, 1979 [NL] Netherlands .................. 7908442

[51] Int. Cl.³ .............................................. A01K 5/02
[52] U.S. Cl. ................................ 119/51 R; 119/56 R
[58] Field of Search ............... 222/55, 56; 119/51 R, 119/56 R, 52 AF, 51.11

[56] References Cited

U.S. PATENT DOCUMENTS

| | | | |
|---|---|---|---|
| 3,796,349 | 3/1974 | Weber | 222/55 |
| 3,850,145 | 11/1974 | Yoder et al. | 119/51 R |
| 3,962,997 | 6/1976 | Roth | 119/51.11 |
| 4,079,699 | 3/1978 | Longmore et al. | 119/51.11 |
| 4,171,684 | 10/1979 | Herr et al. | 119/51 R |
| 4,196,697 | 4/1980 | Poiesz | 119/51 R |
| 4,279,219 | 7/1981 | Brooks | 119/51 R |

Primary Examiner—Hugh R. Chamblee
Attorney, Agent, or Firm—Daley & Brandt

[57] ABSTRACT

A device for feeding cattle, comprising a housing having a head insertion opening therein and a dosing device for supplying food to the feeding device, controlled by signals generated in response to the presence of cattle at said opening, and which makes it possible to give an adapted portion to each individual. According to the invention the device is characterized by a flap disposed downstream of the dosing device and arranged for allowing the passage of one dosed quantity of food at the time. It is thus prevented that an animal can cause residues of food to fall from the dosing device by bumping against the device.

3 Claims, 7 Drawing Figures

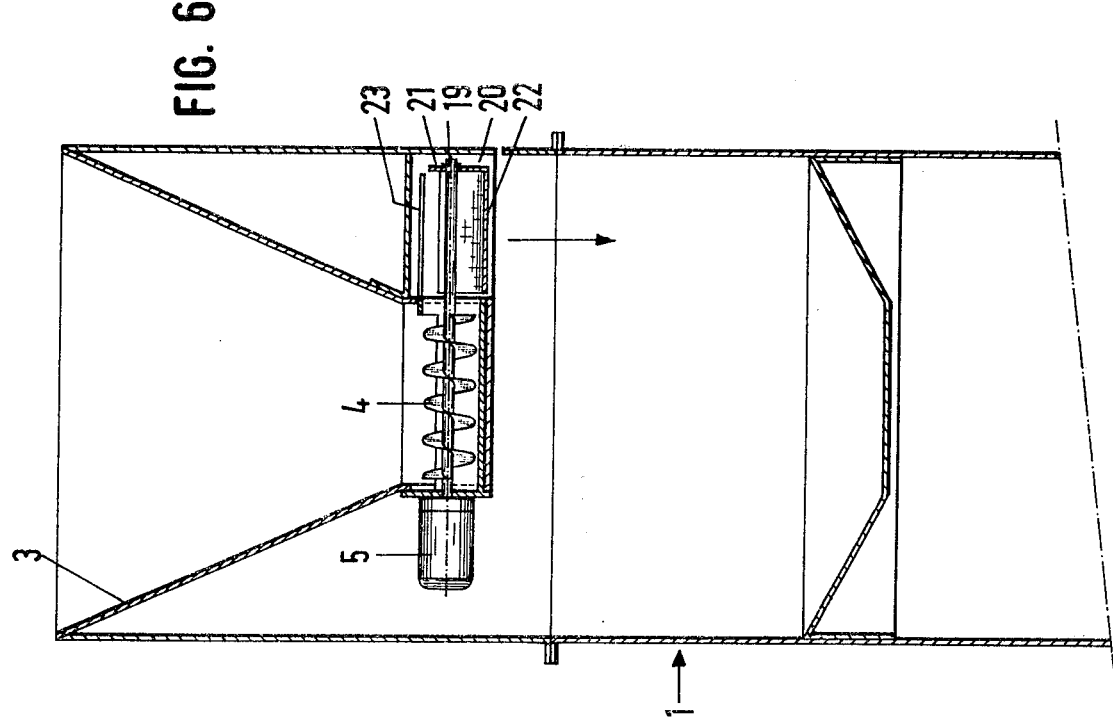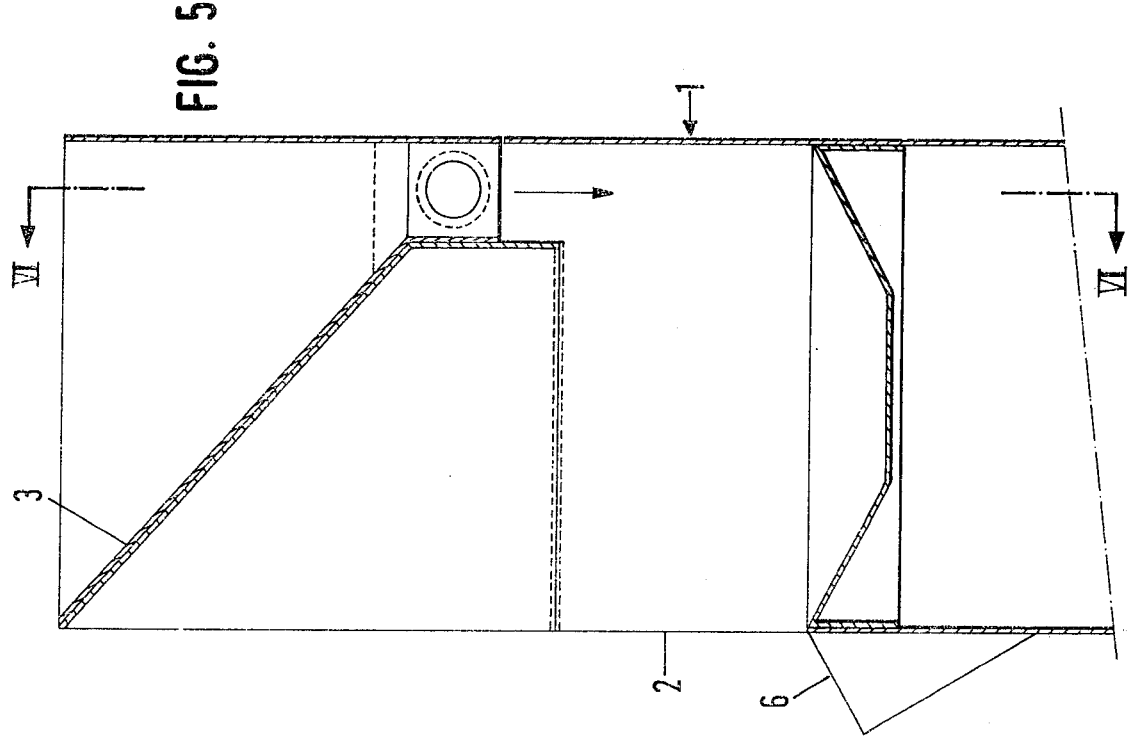

AUTOMATIC CATTLE FEEDING DEVICE

This invention relates to a device for feeding cattle, comprising a housing having a head insertion opening therein and a dosing device for supplying food to the feeding device, controlled by signals generated in response to the presence of cattle at said opening, and which makes it possible to give an adapted portion to each individual.

Such a device is known from U.S. Pat. No. 4,196,697. Meanwhile practice has shown that certain animals rapidly discover that food residues can be caused to fall from the dosing device by bumping against the manger. In the course of time this becomes a habit of each animal. The result is that dosages are incorrect, while the housing is not resistant to the bumping, and in addition the noise constitutes a nuisance.

It is an object of the present invention to remove this drawback.

For this purpose the device according to the invention is characterized by a flap disposed downstream of the dosing device and arranged for allowing the passage of one dosed quantity of food at the time.

Preferably the flap is arranged in a vertical pipe portion intermediate the dosing device and the housing, and takes the form of a tumbler flap provided with a counter-weight. There is thus formed a "self-acting" flap which opens as soon as food falls on it, and automatically closes when the dosing device stops.

In a further elaboration of the invention, the counter-weight and the tumbler flap are disposed so that during the movement thereof the moment is changed. It is thus achieved that the flap does not begin to tumble until after a given quantity of food has been supplied by the dosing device, when the food slides gradually off the flap. During the tumbling, however, the moment will be reduced, as a consequence of which the flap remains open until the last, or practical the last residue of food has been removed. Thereafter the flap will close again whereby the moment is increased. Any food residues that will then fall off it will be too light in weight to cause the flap to be opened again.

In one embodiment of the invention, the vertical pipe portion comprises a restriction, for example, a funnel-shaped portion, whereby the food is accurately poured on the center portion of the flap, and the flap is accordingly opened and closed each time accurately at the same moment.

If desired, the tumbler flap may be provided with a switch included in the electrical circuit of the dosing device, and by means of which the jack motor can accordingly be switched off. As, furthermore, the counter-weight may be made adjustable, it is thus possible to determine the weight of the desired portions.

As an alternative for the tumbler flap, but also applicable in combination with it, the flap according to the invention may take the form of a controlled-rotatable container, to which a quantity of food can be supplied by the dosing device, and which thereafter is rotated once for discharging the food collected in it, either direct into the housing of the feeding device, or into the tumbler flap device which may be disposed under it.

Like the tumbler flap, the rotatable container has the advantage of being insensitive to influence from the cattle, but in addition it is much simpler from a structural point of view.

When a dosing worm is used, in one embodiment of the present invention, the container is mounted at the delivery end of such dosing worm for rotation along with it, so that the contents of the container are discharged per revolution of the worm. There may thus be used a dosing method in which the container functions as a "measuring unit", that is to say that, if one revolution of the worm corresponds to X g food, and a portion must weigh $n \times X$ g, the portion is dosed by n revolutions of the dosing worm.

Unless the rotary container is used in combination with the tumbler flap, the dosing device may be integrated with the housing of the feeding device, i.e. the funnel-shaped supply container constitutes the top part of the housing of the feeding device, and the assembly of rotary container, dosing worm and drive motor is accommodated in the housing to form a complete, compact feeding device.

In order to prevent that, especially in the case of a floury food product, the rotary container is not completely emptied as it is turned round, owing to the fact that the product sticks to the container wall, a scraper may be provided, in particular when the container is formed with a substantially cylindrical configuration, so that the container wall automatically scrapes along it during each revolution.

Some embodiments of the automatic feeding device according to the present invention will now be described, by way of example, with reference to the accompanying drawings. In said drawings, FIG. 1 is a diagrammatic side-elevational view of a device according to the present invention;

FIG. 5 is a side-elevational view of a variant embodiment of the feeding device shown in FIGS. 1–4; and FIG. 6 is a view taken on the line VI—VI of FIG. 5.

Figure 1:
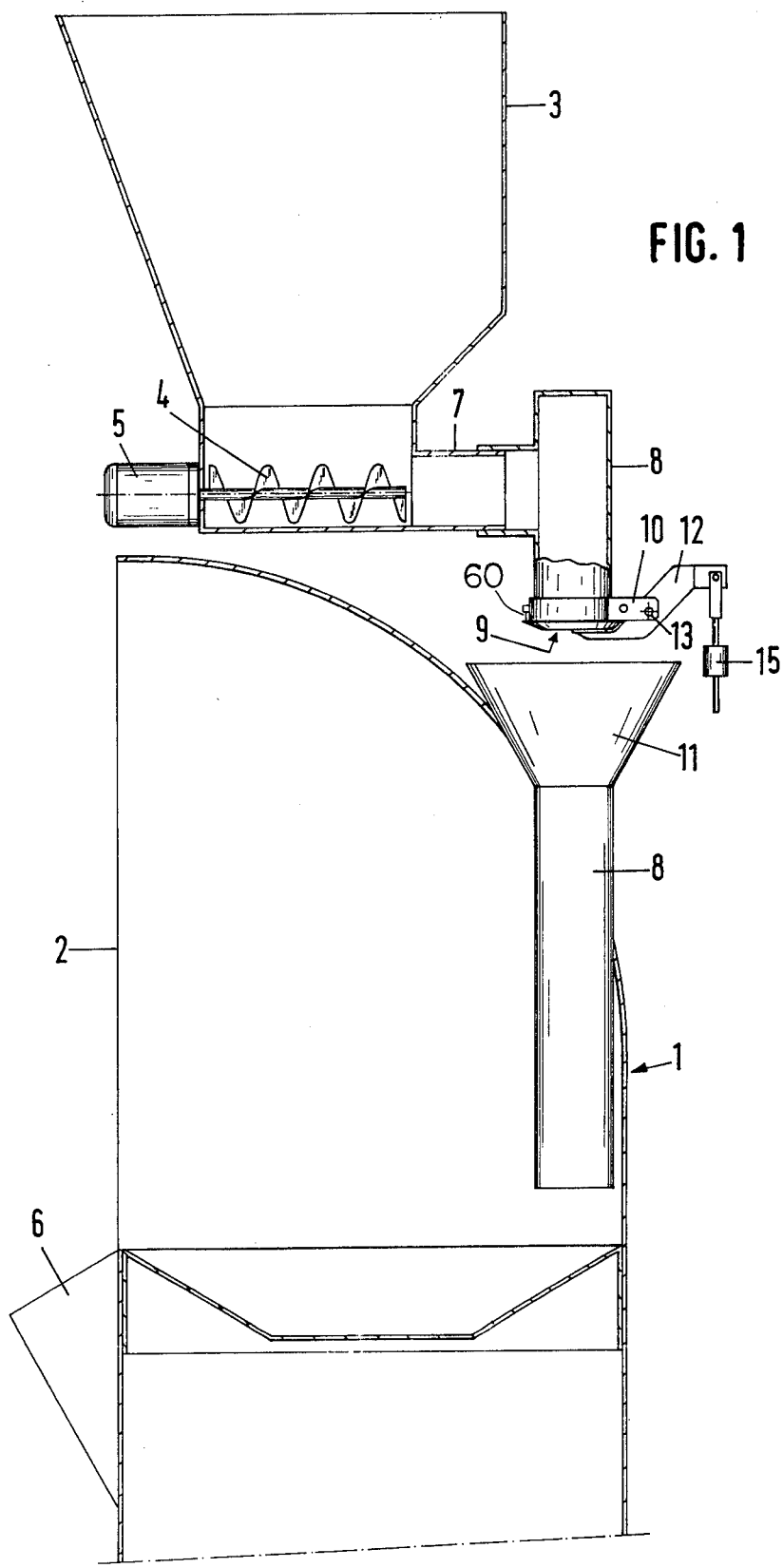

Referring to the drawings, in particular FIGS. 1–4, the feeding device according to the invention comprises a housing 1 with a head insertion opening 2. Disposed above housing 1 is a funnel-shaped supply container 3 having a dosing worm 4 at the bottom. The dosing worm is driven by an electric motor 5 included in an electric circuit which also includes a magnet switch 6 provided below the head insertion opening 2, which switch is responsive to a chain or other signalling means hanging around an animal's neck.

When the dosing worm 4 has been put into operation, food will be transported through a pipe member 7 to an interrupted tube member 8 which opens into housing 1. At the interruption, there is provided a tumbler flap generally designated at 9.

Figure 2:
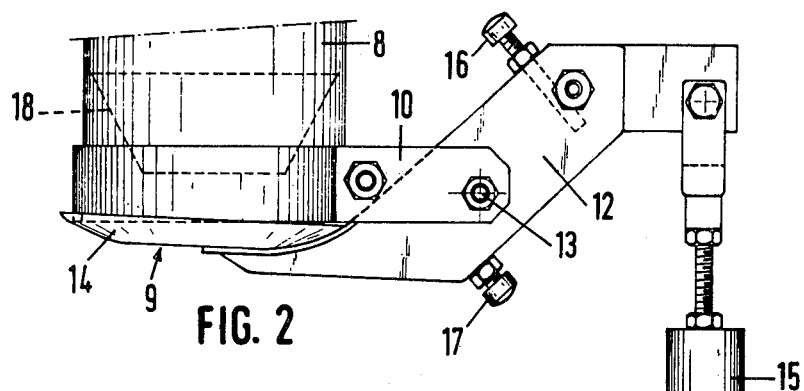
FIG. 2 shows a tumbler flap, used in the device of FIG. 1 at an enlarged scale, and in the closed position.
Figure 3:
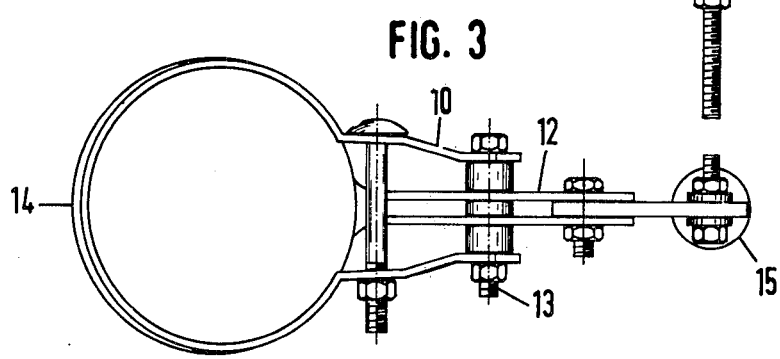
FIG. 3 is a plan view, showing the flap of FIG. 2.
Figure 4:
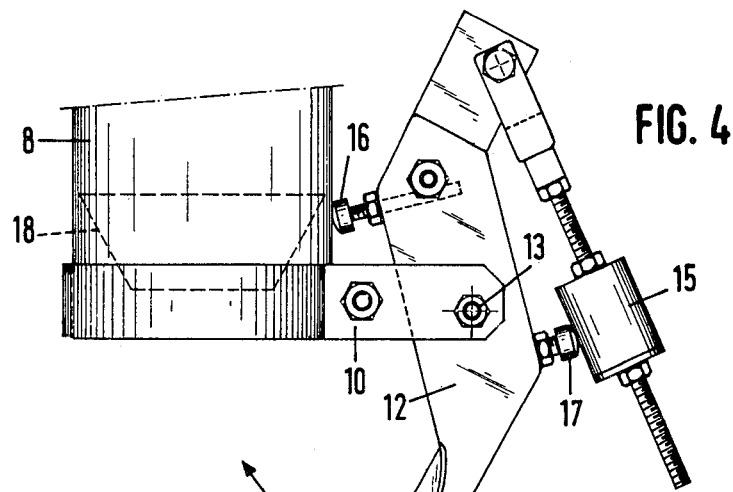
FIG. 4 is a view similar to FIG. 2, and showing the flap in the open position.

As best shown in FIGS. 2–4, flap 9 is secured by means of a retaining clamp 10 to the top part of the interrupted tube section 8 (which is closed at the top), while the bottom tube member 8 is provided with a funnel-shaped inlet 11 (FIG. 1).

Tumbler flap 9 comprises a lever 12 which at point 13 is pivoted to clamp 10. One end of lever 12 carries a dish 14 which can close tube section 8. The other end of the lever is provided with an adjustable counter-weight 15, rotatably suspended from it.

The ratio between the pivots and the weight of the counter-weight have been selected so that after a given quantity of food has been supplied to dish 14 the flap will be slowly opened. Owing to the change in the moment caused by the counter-weight, however, the velocity of the flap becomes progressively higher, until the food slides off dish 14. When all the food, or practically all the food has slid off the flap, the flap will move back to its starting position under the influence of the counter-weight. The flap will not be opened again until after a given quantity of food has been supplied; any food residue which falls on it will not be able to accomplish this.

It will be clear that the tumbler flap must be prevented from being opened beyond its positon of equilibrium. For this purpose the flap is provided with one or more stops, in this case the adjustable stops 16 and 17.

In order to ensure that the tumbler flap always opens under the influence of the same quantity of supplied food, the lower end of the upper tube section 8 is provided with a funnel-shaped portion 18, as a result of which the food supplied will always fall on the center of dish 14.

Figure 7:
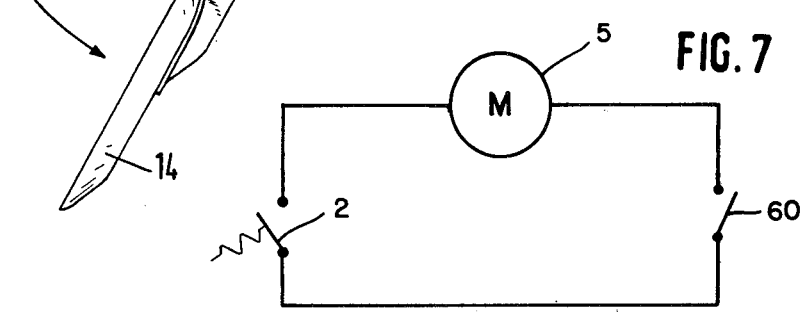
FIG. 7 is a wiring diagram depicting the switch operated by the opening of the tumbler flap and effective to deenergize operation of the dosing worm.

As stated before, if desired the tumbler may be provided with a switch 60 included in the electric circuit for operating motor 5 as shown in FIG. 7. When the tumbler flap 9 moves away from its closure position of the bottom of upper tube part 8, switch 60 is opened and continuity to motor 5 interrupted. In this way, for example, the dosing worm may be stopped as soon as the tumbler flap is opened.

In the embodiment of FIGS. 5-6, corresponding parts are designated by the same reference numerals as in the preceding figures. As shown by FIGS. 5 and 6, funnel 3 is integrated with housing 1. The dosing device is equipped with a worm 4 and a drive motor 5. The shaft of worm 4 has an extension 19 carrying a container 20 rotatable along with worm 4. Container 20 has a closed end wall 21 and a substantially cylindrical side wall 22. Container 20 is open at the top (as depicted in FIG. 6) and also open at the end facing worm 4.

When worm 4 rotates a given amount of food will be introduced into container 20, and as container 20 rotates along with worm 4, this amount is poured into housing 1 of the feeding device, so that it can be eaten by an animal thrusting its head through the opening 2.

If use is made of a feeding system in which each animal carries a transmitter whose signal is representative of the amount of food to which the particular animal is entitled, upon arrival of the animal at the feeding device the signal transmitted by the transmitter will be translated into a number of revolutions of worm 4 and container 20, so that the animal gets the amount of food to which is entitled, provided feeding is not blocked as the animal has already consumed the amount of food to which it is entitled at that moment.

In order to release products sticking to container 20 from the container, a scraper may be provided in the form of a stationary strip 23. During the rotation of the container, the inner surface of side wall 22 of the container moves along the strip and is wiped clean.

I claim:

1. In animal feeding apparatus including
a supply container for holding food,
a dosing device disposed below said supply container and in communication therewith, and
a housing located below said dosing device, said dosing device being operable to remove food from said container and deliver same to a dosing device outlet communicating with said housing, said housing having an opening threrein through which an animal can insert its head to obtain access to food delivered to the housing, the improvement comprising
an interrupted tube assembly having an upper tube part connected communicatively to said dosing device outlet and receiving food therein when said device operates, and a lower tube part spaced below said upper tube part and communicating with said housing,
a tumbler flap mounted for pivoting movement adjacent the bottom of said upper tube part and connected wih a counterweight normally pivoting said tumbler flap in a first direction to a position thereof where it closingly engages the bottom of said upper tube part and retains thereon food delivered to said upper tube part, presence of a predetermined quantity of food on said tumbler flap overcoming the effect of said counterweight and causing said tumbler flap to pivot in a second opposite direction to a second position remote from said upper tube part bottom and thereby drop the food therefrom into said lower tube part, and
a switch operable upon movement of said tumbler flap from its closure position to second position to stop operation of said dosing device.

2. In animal feeding apparatus including
a supply container for holding food,
a dosing device disposed below said supply container and in communication therewith, and
a housing located below said dosing device, said dosing device being operable to remove food from said container and deliver same to a dosing device outlet communicating with said housing, said housing having an opening therein through which an animal can insert its head to obtain access to food delivered to the housing, the improvement comprising
a second container disposed adjacent said dosing device and receiving food from said device when said device is operated, said second container being open at the top and covering said outlet, said second container being rotatable to move the open top thereof past said outlet to thereby discharge food therein to said housing, said dosing device being a worm device, said second container being connected to said worm device for rotation therewith.

3. The animal feeding apparatus of claim 2 further comprising scraper means fixed relative to said second container and engageable with the inner surface of said second container during the course of rotation thereof for wiping said inner surface clean of food.

* * * * *

UNITED STATES PATENT AND TRADEMARK OFFICE
CERTIFICATE OF CORRECTION

PATENT NO. : 4,363,291
DATED : December 14, 1982
INVENTOR(S) : Jan H. Harmsen

It is certified that error appears in the above–identified patent and that said Letters Patent are hereby corrected as shown below:

On the title page:

Foreign Application Priority Data should read:

Nov. 19, 1979 [NL]  Netherlands............7908442
May 23, 1980 [NL]  Netherlands............8003014

Signed and Sealed this

Twenty-second Day of March 1983

[SEAL]

Attest:

GERALD J. MOSSINGHOFF

Attesting Officer

Commissioner of Patents and Trademarks